United States Patent [19]
Miller

[11] 3,880,499
[45] Apr. 29, 1975

[54] LIGHT PAINTING WITH STEPPED PRISMS

[76] Inventor: Robert L. Miller, 115 Wilmot St., San Francisco, Calif. 94115

[22] Filed: June 4, 1973

[21] Appl. No.: 366,891

[52] U.S. Cl. .................. 350/286; 350/287; 350/260
[51] Int. Cl. .............................................. G02b 5/04
[58] Field of Search .................... 350/162, 260–263, 350/286, 287, 304; 248/479–484

[56] References Cited
UNITED STATES PATENTS

| | | | |
|---|---|---|---|
| 3,393,034 | 7/1968 | Senzo | 350/286 |
| R26,617 | 6/1969 | Staunton | 350/286 |

*Primary Examiner*—William L. Sikes
*Assistant Examiner*—Michael J. Tokar

[57] ABSTRACT

Stepped prism sheets of a formed transparent plastic are provided having flexible or rigid interconnecting webs between adjacent prisms or the vertex of one prism and the base of the adjacent prism contiguous. The prism sheets can be mirrored on the stepped side or left transparent. The stepped or jagged faces of two sheets of stepped prisms are matingly engaged with one or both of the mating surfaces mirrored or a reflecting sheet interposed, to form a stepped prism composite structure.

In one embodiment, complementary centrally located orifices are provided in each of the two sheets and the sheets joined to provide a housing locked about a spherical bearing. The ball joint assembly allows for free positioning of the resulting composite stepped prism structure in relation to the sun or other light source.

In a preferred embodiment, a plurality of stepped prism composite structures are employed. Arms are pivotally mounted on opposite sides of the stepped prism composite structure of the ball joint assembly. Additional stepped prism composite structures are pivotally mounted intermediate the arms. The resulting assemblage may be used in conjunction with mirrors or with means for moving the prisms or mirrors in relation to the movement of the sun, much in the nature of a heliostat.

13 Claims, 12 Drawing Figures 3,880,499
SHEET 1 OF 2
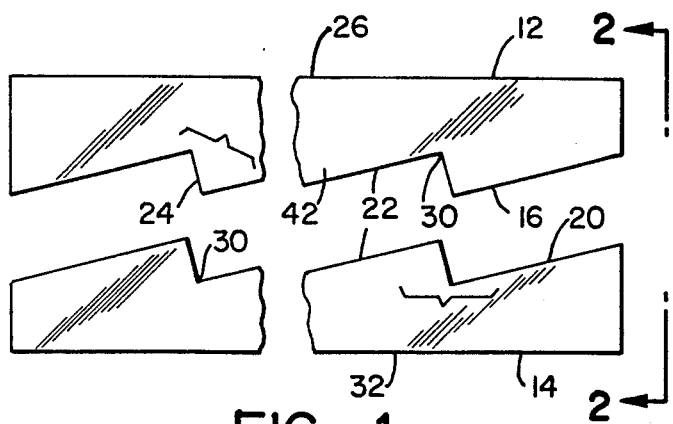
FIG_1
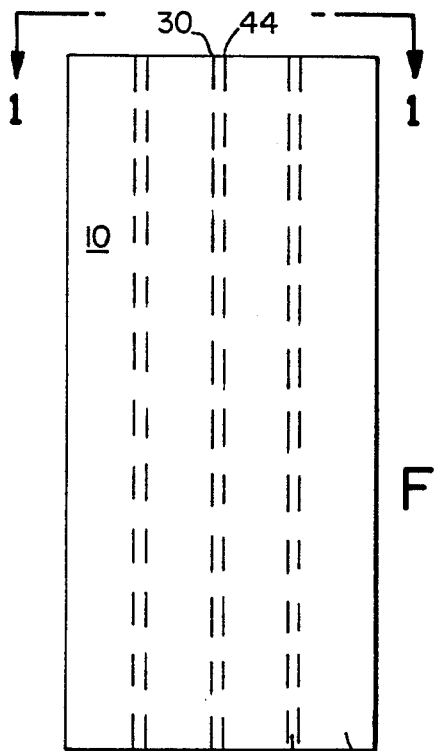
FIG_3
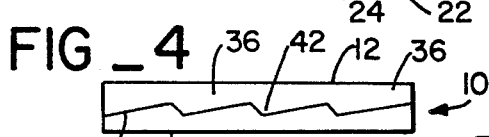
FIG_4
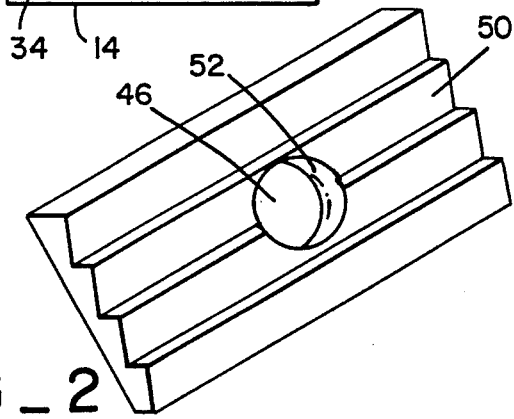
FIG_2
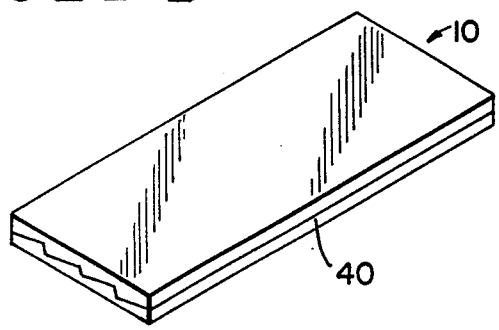
FIG_5
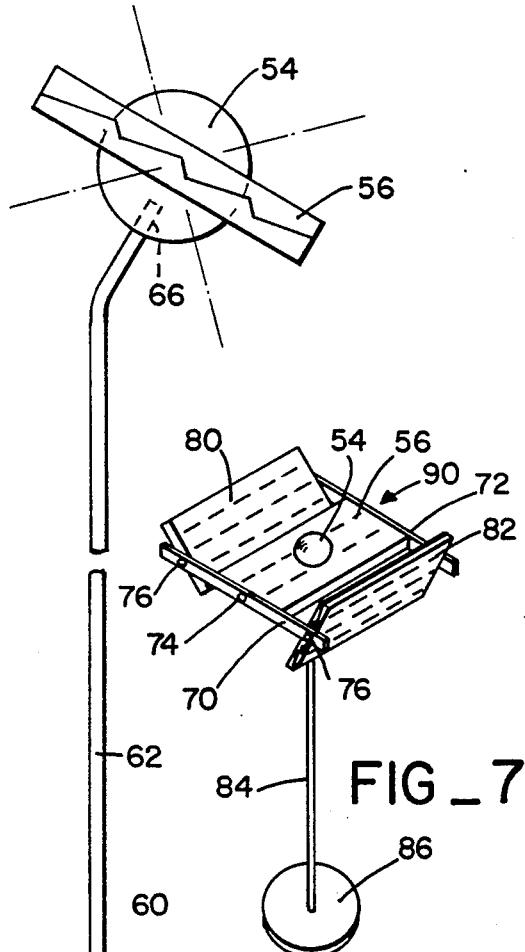
FIG_6
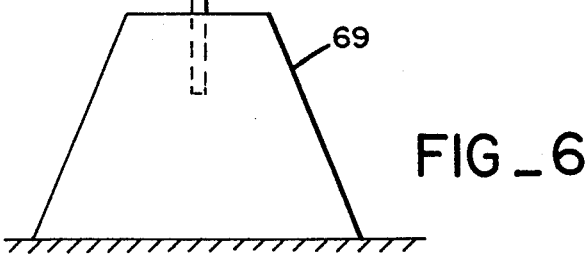
FIG_7

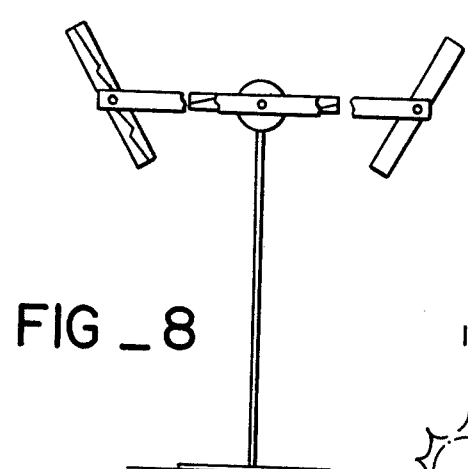
FIG_8
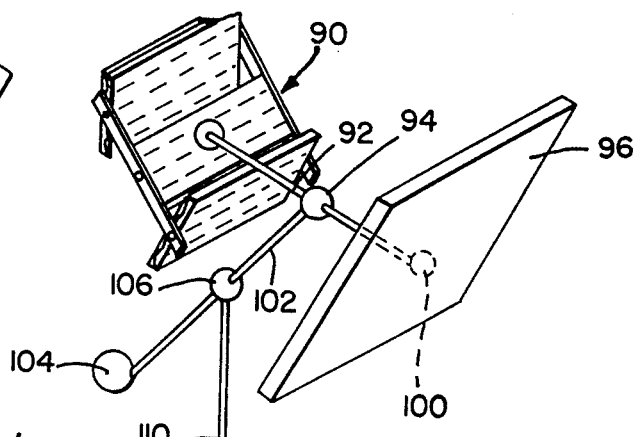
FIG_10
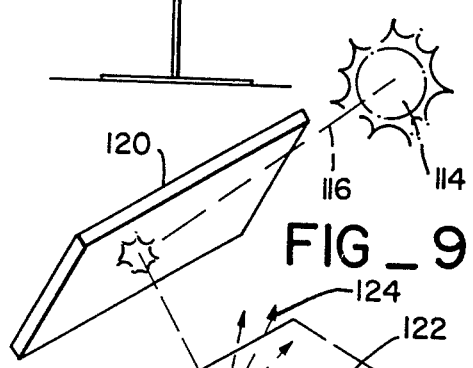
FIG_9
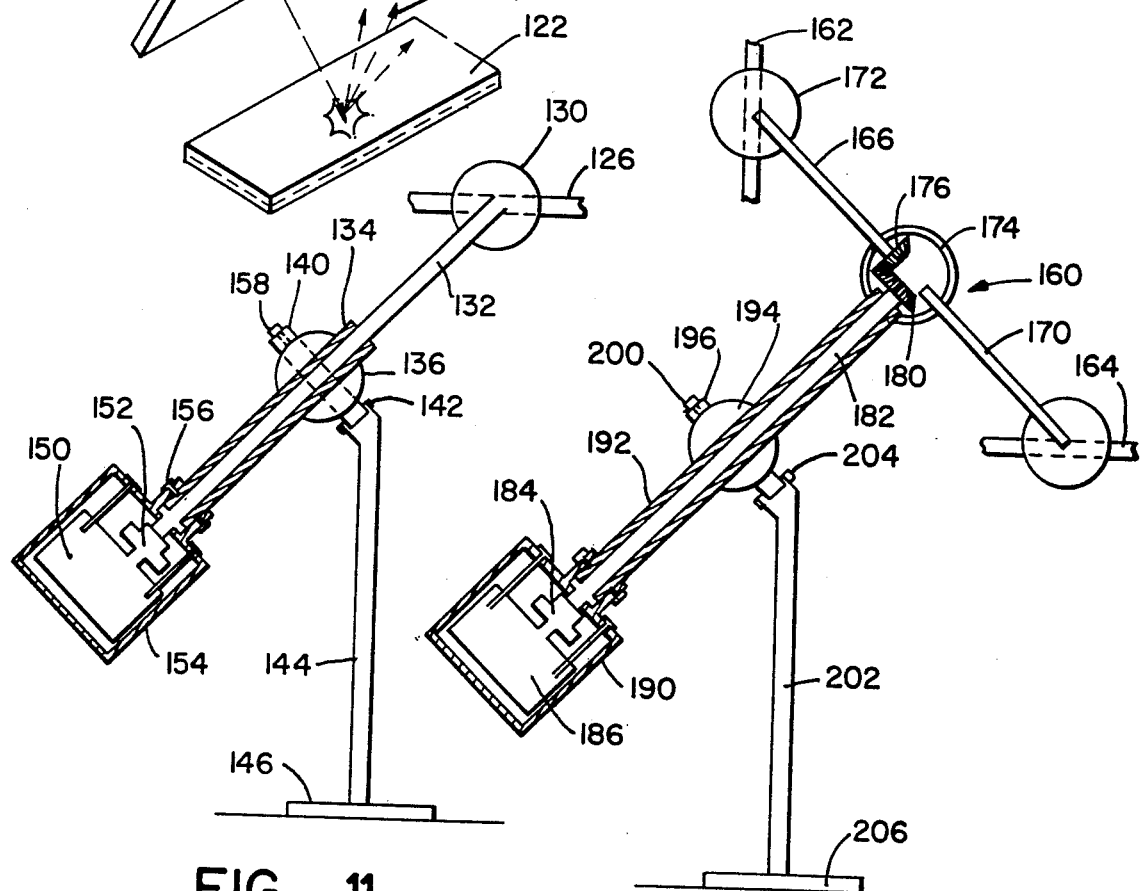
FIG_11
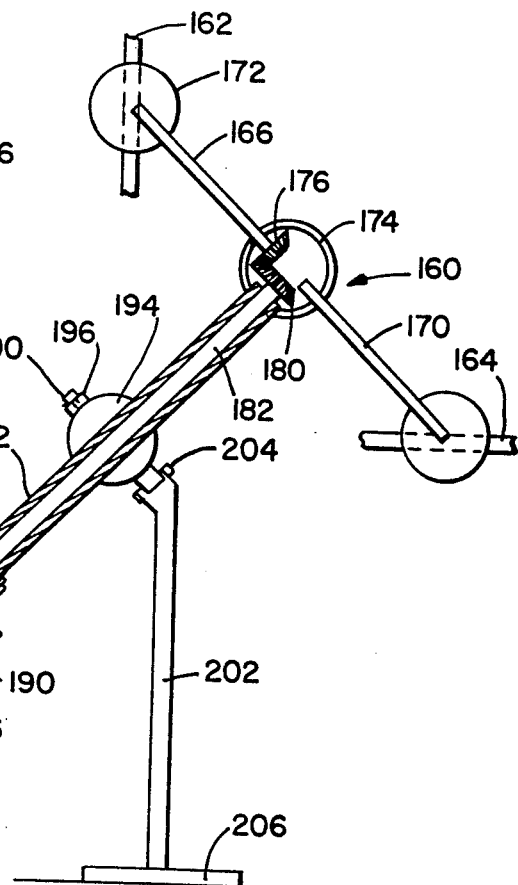
FIG_12

LIGHT PAINTING WITH STEPPED PRISMS

BACKGROUND OF THE INVENTION

1. Field of the Invention

The dispersion by refraction of sunlight by prisms provides an educational and artistic display of colored light which can be used in a variety of ways. For example, sheets of parallel stepped prisms can be used to cover windows, so as to provide attractive displays of colored light against walls or may be further reflected, particularly with mirrored plastic sheets, so as to provide artistic patterns of colored light about a room. The sheets, in turn, can provide privacy in that the stepped prism sheet will distort images in the room viewed from the other side of the stepped prism sheet.

Flexible mirrored sheets of stepped prisms can be shaped in various forms so as to refract light and superimpose light from a number of prisms so as to provide a spectrum of variegated colors. By further reflecting the light from the prism sheet, attractive designs can be created which can provide decorative effects on walls, curtains, or the like, providing a light show of an evanescent character.

Stepped prisms can also be used for sculptural and educational effects, by using stepped prisms in combination with other reflecting surfaces and providing means for moving the stepped prisms or reflecting surfaces in relation to the sun. By using moving means analogous to a heliostat, a continual display of colored light forms can be obtained. In this manner, not only does the device provide a continually attractive sculptural embodiment, but also sun painting can be achieved with attractive visual effects providing aesthetic enjoyment.

2. Description of the Prior Art

The use of prisms as toys, for aesthetic purposes and for utilitarian purposes is found in U.S. Pat. Nos. 257,822; 301,561 and 2,855,519. A variety of different stepped prisms are illustrated in U.S. Pat. Nos. 2,248,638, which exemplifies a thin flexible sheet material of prismatic elements; 1,792,046, which exemplifies a stepped prism for a monochromator; and U.S. Pat. No. 3,254,556, which discloses low cost optical stepped prisms. Heliostats are exemplified in U.S. Pat. Nos. 333,769 and 1,976,428.

SUMMARY OF THE INVENTION

Stepped multiprism slabs are provided which are formed from two independent multiprism sheets. The stepped or saw-toothed surfaces of the two sheets are matingly engaged with a reflective surface interposed.

In one embodiment, the sheets have centrally located openings with concave inclined walls. The two sheets are joined about a sphere forming a universal joint. Arms are pivotally mounted at opposite ends of the slab with additional multiprism slabs pivotally secured between the arms to form an array or assemblage of three or more slabs. The array is constructed to have the center of gravity at the center of the universal joint.

A heliostat mechanism is employed for automatically moving the array of prisms in relation to the movement of the sun. An array of mirrors or a single mirror complementary to the array of multiprism slabs can be mounted on opposite ends of a shaft. The mirror(s) or prisms are rotated in relation to the sun, with the alternate member receiving reflected sunlight and reflecting the resultant light onto a surface. An independent reflecting surface is provided which is mounted at a sufficient distance from the multiprism to allow for substantial resolution of the sunlight into its component wavelengths. The light reflected from the remote reflector is transmitted onto a surface in artistic patterns.

BRIEF DESCRIPTION OF THE DRAWINGS

FIG. 1 is an exploded end view of a pair of multiprism sheets, which when assembled effect a multiprism member;

FIG. 2 is a perspective view of one multiprism element for mounting on a ball;

FIG. 3 is a plan view of the multiprism member;

FIG. 4 is an endwise view with the sheets assembled;

FIG. 5 is a perspective of the multiprism member;

FIG. 6 is a multiprism member mounted on a ball joint;

FIG. 7 is a perspective view of a plurality of multiprism members carried on a ball-joint mount;

FIG. 8 shows angularly related positions of the multiprism members of a construction such as shown in FIG. 7;

FIG. 9 is a basic illustration of the use of a reflector in conjunction with the multiprism member;

FIG. 10 is a perspective of a device having a multiprism array and a mirror complementary to the multiprims;

FIG. 11 is an elevation partially in section illustrating a mechanically rotated prism member array; and FIG. 12 is an elevation partially in section for heliostatically controlled complementary multiprism and mirror arrays.

DESCRIPTION OF THE SPECIFIC EMBODIMENTS

Stepped multiprism slabs are provided which are constructed from two independent stepped prism sheets. The sheets are matingly engaged at the stepped or saw-toothed surface with a reflective surface interposed between the two sheets. The reflective surface may be an independent film of aluminum or other reflective material, or may be a mirror which has been coated onto one or both of the stepped surfaces of the multiprism sheet. Any adhesive which allows for a strong bond at the involved surfaces, and does not deteriorate the reflective capability of the reflective surface can be used. Where an independent reflective sheet is employed, a transparent stable adhesive is required. Where both of the surfaces of the independent multiprism sheets are mirrored, any stable adhesive can be employed which does not affect the reflective capabilities of the mirrored surfaces.

By virtue of the subject construction, numerous advantages are achieved. First, the reflective surface is protected from the elements and environment, so that the mirrored surface or reflective element maintains its reflective capacity for long periods of time. Secondly, one obtains a multiprism which is reflective on both sides. This provides an aesthetically pleasing appearance, and augments the multiprism slab, both as an educational tool and as a toy. Because both sides of the slab are reflective and refractive, one can obtain both reflective and refractive effect simultaneously. For example, the image formed by the multiprism will provide rainbowed edges where there is a transition from light to dark, such as the corner of a window or building. The sunlight reflection from the multiprism will provide a plurality of rainbow images on a surface.

A further advantage in using two independent stepped prism sheets is the opportunity to provide an integral ball or universal joint as part of the multiprism. Symmetrically situated openings can be provided in the two independent sheets with a mildly inclined or concave surface. The two sheets can then be brought together having one or both of the joined surfaces mirrored. Alternatively, a reflective film can be introduced intermediate the two surfaces. The two sheets are bonded to form a composite multiprism structure about a ball. In this manner, the two sheets form a universal or ball jont, acting as the housing for the ball. By using a clear plastic as the ball joint, into which is introduced a supporting rod, an attractive and useful device is obtained. By having the center of the ball joint as the center of gravity, and providing some friction between the multiprism and the ball, the multiprism can be readily adjusted to the desired angle and retain its position.

To enhance the attractiveness and flexibility in the use of the multiprism slabs, arms can be pivotally attached to the multiprism slab, where the attachment is on the center line parallel to the lines defined by the vertices of the prisms. The arms extend equidistantly in both directions and additional slabs can be pivotally joined intermediate the arms, so as to provide an array or assemblage of multiprism slabs, while still retaining the center of gravity of the assemblage in the center of the ball joint. By mounting the assemblage onto a shaft joined to a timing clock, the assemblage can be moved in correlation with the movement of the sun, while maintaining the spectral reflection from the array at the same spot in a room.

As a further variation, one or more mirrors can be employed which are mounted in conjunction with the timing clock, whereby the mirrors retain their appropriate position in relation to the sun and reflect the light onto the multiprism assemblage. In this manner, flexibility in orientation of the dispersed light can be achieved.

In order to obtain a sun painting, as an aesthetically pleasing abstract distribution of colors, appearing as a three-dimensional fine web of colors on a flat surface, the light refracted by the prisms is reflected onto a secondary reflecting surface, particularly a mirrored film. The secondary reflecting surface then reflects the light onto an opaque surface, particularly a white surface. The secondary reflector should be positioned a substantial distance from the multiprism slab or slabs, so as to allow for significant resolution of the light of the various wavelengths. Usually, a distance of about 10 or more feet is required, between the multiprism and the secondary reflecting surface. Depending on the size of the sun painting desired, the receiving surface may be as little as one foot or ten or more feet away.

For further understanding of the subject invention, the drawings will now be considered. In FIGS. 3 and 5, the multiprism slab 10 is depicted in two different views. As appears in FIG. 1, the multiprism slabs 10 are formed from two independent sheets 12 and 14 having stepped surfaces 16 and 20 respectively.

The sheets can be formed of a wide variety of transparent materials, such as glass and plastics. Of particular interest are plastic materials, such as polyvinyl chloride, polyester resins, polypropylene, poly (4-methylpentene) and the like. That is, transparent addition or condensation polymers, which may be molded, extruded, or otherwise shaped as stepped prisms by means known in the art.

Since the stepped prism sheets 12 and 14 are the same, except that the direction of the steps has been reversed for the lower sheet 14 in relation to the upper sheet 12, the discussion of the multiprism sheets will be limited to the upper sheet. Unless otherwise indicated, the statements in reference to the upper sheet 12 are similarly applicable to the lower sheet 14.

The multiprism sheet has a plurality of reflective or exit faces 22 and base faces 24, which will usually be in parallel planes or in registry. The entry face 26 is a flat surface substantially equidistant from the vertices 30. The entry face 26 of the upper prism 12 is parallel to the entry face 32 of the prism sheet 14, when the two multiprism sheets 12 and 14 are joined to form the multiprism slab 10.

One or both of the stepped surfaces 16 and 20 may be mirrored with a reflecting surface. Alternatively, a reflecting sheet may be introduced between the two multiprism sheets 12 and 14. The advantage of mirroring both of the stepped surfaces 16 and 20 is that one need not be concerned with the clarity and transparency of the adhesive employed for bonding the two multiprism sheets 12 and 14 together. The reflective material formed on the stepped surfaces 16 and 20 may be formed by vacuum deposition, electroplating, chemical silvering, painting, or the like.

When the complementary stepped surfaces 16 and 20 are cemented together, a multiprism slab 10 is formed as depicted in FIGS. 4 and 5. The juncture line 34 appears as a saw-toothed configuration along the side 36 which is transverse to the length of the prism. The joint between the two stepped prism sheets 12 and 14 is a straight line 40, parallel to the length of the prism. Each of the individual prisms 42 will extend the length of the multiprism slab 10, so as to provide a relatively broad spectral band reflection.

The size of the slabs may be varied widely depending on the use for the slab, the width and length of the polychromatic image formed, and the like. Usually, at least three steps will be employed providing a stepped prism of at least 1 inch. When constructions are made, the slab will be at least 1.5 inches in the direction normal to the plane of the prism faces. In the direction parallel to the plane of the prism faces, the slab will be 1 inch or more, frequently 2 inches or more. For constructions, the slab will be at least four inches and usually have a greater dimension by at least a factor of two in the parallel direction as compared to the normal direction.

As the multiprism slab appears in FIG. 3, the vertices 30 and 44, which define the edges of the reflecting face 22 and the base face 24, appear as lines, running the length of the multiprism slab.

The angle the base face 24 makes with the reflecting face 22 may be varied. The angle which the reflecting face 22 makes with the entry face, if the plane defining the reflecting face is extended to the entry face 26 will generally be less than about 45°, and usually from about 10°–25°. The distances of the vertices 30 and 44 from the nearest entry face can be varied widely, anywhere from about 0.5mm to 5mm or more. The particular thickness of the multiprism slab 10, as well as the dimensions of the reflecting face 22 and base face 24 may be varied widely, primarily being a matter of convenience, strength and minimizing absorption of light.

The multiprism slab having a reflecting surface provides a compact means for simulating a much larger single prism, where the reflecting faces 22 are in parallel planes. With the multiprism slab, an intense rainbow reflection can be tramsmitted to a surface and with a sufficient distance between the multiprism slab 10 and the receiving surface, good resolution of light into its component wavelengths is obtained. Also, the multiprism slab provides reflection and refraction on both sides.

In one embodiment of the subject invention as depicted in FIG. 2, an opening 46 is provided which is centrally located in the multiprism sheet 50. The opening has concave sides 52.

Two of the sheets 50 may be complementarily cemented together about a ball 54 to form a ball joint with the multiprism slab 56 acting as the housing for the ball. See FIG. 6. Conveniently, a stand 60 can be provided having a rod 62 mounted on a base 64 at one end and fitted into a socket 66 in the ball 54 at the other end.

The multiprism slab 56 fits snugly about the ball 54, with the center of the ball as the center of gravity of the ball 54 and multiprism slab 56. Alternatively, in place of the ball 54, a disc could be used, made of the same construction as the multiprism slab 56, similarly having a socket 66 for being mounted on the stand. When the multiprism slab 54 would be in registration with the disc, the surface of the multiprism slab 56 would be uniform. Preferably, the ball 54 is transparent to enhance the attractiveness of the assembly.

In FIG. 7, a further embodiment of the subject invention is depicted. The multiprism slab 56 mounted on ball 54 is provided with two arms 70 and 72 which are pivotally connected to the multiprism slab 56 by means of flat-headed pins 74 on either side of the multiprism slab 56. The pins 74 are rigidly secured in bores in the multiprism slab 56. The line defined by the two pins 74 is the body axis of the multiprism slab 56. The two arms 70 and 72 extend symmetrically outward from the pins 74. Pivotally mounted equidistantly from the central multiprism slab 56, by means of pins 76 and intermediate the arms 70 and 72 are two multiprism slabs 80 and 82. The two multiprism slabs 80 and 82 are pivotally mounted with pins 76 defining the body axis of the multiprism slabs in the same manner described previously. With the two multiprism slabs of the same dimensions, the center of gravity is maintained at the center of the ball 54. By providing some frictional engagement between the arms 70 and 72 and the multiprism slabs 80 and 82, the multiprism slabs may be pivoted into various positions and retain that position until some additional force is applied to them.

The ball 54 may be mounted by means of rod 84 to a base 86, providing an aesthetically pleasing structure. Each of the multiprism slabs 56, 80 and 82 can be set so as to reflect sunlight or other source of polychromatic light. The various slabs may be moved in relationship to each other, so that the dispersed polychromatic light reflected from the multiprisms may be overlapped or separated as desired. By overlapping the polychromatic light, variegated effects can be achieved.

To futher enhance the versatility of the multiprism assemblage 90, the multiprism assemblage may be mounted at one end of a rod 92 which is rigidly secured to and passes through as ball housing 94, as depicted in FIG. 10. At the other end of the rod is a pivotally mounted mirror 96, which is able to turn on ball 100 in the same manner as the multiprism slab. The ball housing 94 is secured to rod 102 which has a counterweight 104 at the other end. The rod 102 passes through a ball housing 106 which is rotatably mounted on supporting pier 110 secured in base 112.

The mirror 96 receives the sunlight and reflects the sunlight onto the multiprism assemblage 90. The various multiprism slabs may be adjusted so as to provide the reflected dispersed polychromatic light onto a surface in a desired spatial relationship. Since the mirror 96 and the multiprism assemblage 90 can be rotated about the rod 102, while the rod 102 can be rotated about the pier 110, a stationary base can be employed and the various parts moved in relation to the position of the sun.

As indicated in FIG. 9, the sunlight from the sun 114 or other polychromatic light source, depicted as a single ray 116, strikes the mirror 120 and is reflected onto the multiprism slab 122. The polychromatic light is dispersed by the prism 122 and appears as a plurality of rays 124 of substantially monochromatic light.

Referring now to FIG. 11, a construction is shown for tracking the sun by means of a clockwork mechanism. In this instance, only the center prism member 126 is shown adjustably carried on ball 130. It is understood that any array or plurality of multiprism slabs can be employed.

Ball 130 is secured to shaft 132 which is rotatably channeled in sleeve 134. Sleeve 134 is in turn supported by a ball mount 136 which in turn is secured in ring 140. The ring 140 is held in an angularly adjustable position by set screw 142 which secures ring 140 to post 144. The post 144 is mounted in base 146 to provide a stable structure.

Shaft 132 is secured to a clockwork mechanism 150 by means of a friction clutch 152 or other convenient connecting means. The clockwork 150 may be housed in a suitable housing 154 which can be secured to the channel 134 in any convenient manner, for example, rivets 156.

The channel and shaft 132 are aligned with the north-south axis of the Earth. The prism is adjusted so that light from the prism is reflected up the polar axis. The angle which the shaft 132 makes with the ground or base, is based on the particular latitude. The shaft angle can be adjusted by loosening set screw 158 which allows for rotation of ball 136 in ring 140. In this manner, the shaft 132 can be adjusted to the appropriate angle for the latitude in which the apparatus is employed.

In FIG. 12, apparatus 160 is depicted which employs a combination of a mirror 162 and multiprism slab 164. In the depicted embodiment, the mirror is positioned so as to reflect the light down the polar axis which is defined by the shafts 166 and 170. Alternatively, the mirror and prism can be exchanged, with the mirror being the lower member and reflecting the sunlight up the polar axis. In this embodiment, instead of a multiprism slab, a stepped multiprism sheet can be employed which is transparent. The light then would be reflected from the mirror and dispersed by the multiprism sheet into a polychromatic array.

As depicted in FIG. 12, a ball 172 is rigidly mounted on shaft 166 along an axis of ball 172. The mirror 162 is rotatably mounted on the ball 172. A spherical gear housing 174 houses bevel gears 176 and 180. Shaft 166 is rigidly connected to bevel gear 176, while shaft 182 is rigidly connected to bevel gear 180 at one end, and at the other end is connected by friction clutch 184 to a timing mechanism 186. The timing mechanism is housed in housing 190 which is secured to tube 192 in which shaft 182 is journaled. Tube 192 passes through ball 194 which is rotatably held in ring 196 and fixed in position by set screw 200. The ring 196 is mounted in post 202 by means of bolt 204, with the post 202 set in base 206.

The alignment is substantially the same as described previously for the apparatus having solely the prism. The shafts 166 and 170, as already indicated, are along the polar axis. The reflecting mirror, whether above or below the gear housing, is positioned so as to reflect the sunlight up or down the polar axis. The shaft 182 which connects the gears to the clock mechanism is also in the north south plane. The angle which the shaft 182 makes with the ground is adjusted according to latitude. The timing mechanism turns the gears which turn the mirror so that as the sun traverses the sky, the light is continuously reflected on the prism at the same angle.

It is understood, that while only one prism has been discussed, assemblages of prisms as described previously may be employed. Also, while a single mirror is preferred, assemblages of mirrors having structures analogous to the assemblages of prisms may also be used.

The subject invention provides a variety of novel embodiments which permit educational, entertaining and aesthetically pleasing color effects. By employing in combination, secondary reflectors, such as mirrored films, aesthetically pleasing three-dimensionally appearing light shows or sun paintings can be achieved, providing decorative effects in malls, rooms, lobbies, and the like. The various devices are of pleasing structure, so as to have the appearance of modern sculpture.

Although the foregoing invention has been described in some detail by way of illustration and example for purposes of clarity of understanding, it will be obvious that certain changes and modifications may be practiced within the scope of the appended claims.

What is claimed is:

1. A reflective stepped multiprism slab comprising:
a circular member;
first and second complementary transparent stepped prism sheets having complementary openings with concave sides, each of said sheets having a planar surface and a saw-toothed surface with said saw-toothed surfaces matingly engaged and said circular member rotatably contained in said openings;
a reflective film intermediate said saw-toothed surfaces;
and a rod rigidly, centrally secured to said circular member.

2. A reflective stepped multiprism slab according to claim 1, wherein said openings are centrally located and said reflective film comprises independent reflective films rigidly adhered to each of said saw-toothed surfaces.

3. A reflective stepped multiprism slab according to claim 2,
including time synchronous rotating means, and wherein said rod is operatively secured to said time synchronous rotating means.

4. A reflective stepped multiprism assemblage comprising:
a circular member;
first and second complementary transparent stepped prism sheets having complementary openings with concave sides, each of said sheets having a planar surface and a saw-toothed surface with said saw-toothed surfaces matingly engaged, defining a central multiprism slab, and said circular member rotatably contained in said openings;
a reflective film intermediate said saw-toothed surfaces;
arms pivotally mounted on the body axis of said central multiprism slab extending outwardly from said slab;
a plurality of stepped multiprism reflective slabs pivotally mounted intermediate said arms and symmetrically disposed about said central mutliprism slab;
and a rod rigidly secured to said circular member.

5. An assemblage according to claim 4, including
time synchronous rotating means, and wherein said rod is operatively connected to said time synchronous rotating means and said reflective film comprises independent relective flims rigidly adhered to said saw-toothed surfaces.

6. An assemblage according to claim 4, including a rotatably mounted mirror connected to said rod and supporting means pivotally connected to said rod intermediate said mirror and said circular member.

7. An assemblage according to claim 6, including time synchronous rotating means, wherein one of said mirror or said circular member is operatively connected.

8. A stepped multiprism heliostat assemblage comprising:
first and second circular members;
a stepped multiprism member having a central opening rotatably mounted on said first circular member;
reflecting means rotatably mounted on said second circular member;
separation means connecting said first and second circular members in fixed spatial relationship;
time synchronous rotating means;
rotational transmitting means for operatively connecting one of said first and second circular members to said time synchronous rotating means; and
supporting means, said rotational transmitting means being pivotally mounted on said supporting means.

9. An assemblage according to claim 8, wherein said stepped multiprism member comprises two matingly engaged stepped transparent multiprism sheets and a reflective film intermediate said two sheets.

10. An assemblage according to claim 9, wherein said rotational transmitting means comprises first and second matingly engaged bevel gears, a shaft operatively connecting said time synchronous rotating means to the bevel gears, and a shaft connecting one of said first or second circular member to said second bevel gear.

11. An assemblage according to claim 8, wherein said stepped multiprism member is transparent.

12. A kit for providing sun painting comprising a mirrored plastic sheet and an assemblage according to claim 4.

13. A kit for providing sun painting comprising a mirrored plastic sheet and an assemblage according to claim 8.

* * * * *